US012746564B2

(12) United States Patent
Batts et al.

(10) Patent No.: US 12,746,564 B2
(45) Date of Patent: Sep. 29, 2026

(54) SPRINKLER DEVICE

(71) Applicants: Joel Batts, Lakeland, FL (US); Michael Giordano, Osceola, IN (US)

(72) Inventors: Joel Batts, Lakeland, FL (US); Michael Giordano, Osceola, IN (US)

( * ) Notice: Subject to any disclaimer, the term of this patent is extended or adjusted under 35 U.S.C. 154(b) by 164 days.

(21) Appl. No.: 18/752,979

(22) Filed: Jun. 25, 2024

(65) Prior Publication Data

US 2025/0387797 A1 Dec. 25, 2025

(51) Int. Cl.
*B05B 15/628* (2018.01)

(52) U.S. Cl.
CPC .................................. *B05B 15/628* (2018.02)

(58) Field of Classification Search
CPC ..... B05B 15/628; B05B 15/656; B05B 15/68; B05B 15/70; B05B 15/72; B05B 15/74; F16L 37/091; F16L 37/0915
See application file for complete search history.

(56) References Cited

U.S. PATENT DOCUMENTS

| | | | | |
|---|---|---|---|---|
| 9,604,404 | B2 * | 3/2017 | Ericksen | F16L 37/008 |
| 2011/0042485 | A1 * | 2/2011 | McNulty | B05B 15/628 239/203 |
| 2015/0145248 | A1 * | 5/2015 | Hagen | F16L 37/0915 285/340 |
| 2021/0094057 | A1 * | 4/2021 | Hansen | B05B 15/628 |
| 2024/0359202 | A1 * | 10/2024 | Ketterling | B05B 15/74 |

* cited by examiner

*Primary Examiner* — Darren W Gorman
(74) *Attorney, Agent, or Firm* — The Rapacke Law Group, P.A.; Andrew S. Rapacke; Kenneth F. Brooks

(57) ABSTRACT

A sprinkler device can include a first tubular body; a second tubular body, one or more toothed rings at least partially retained within a lower portion of the second tubular body, the one or more toothed rings having two or more teeth that are constructed and arranged to be in sliding communication with at least an outer surface of a third tubular body so that a position of the sprinkler device is adjustable in a downward direction along the third tubular body, the two or more teeth being further constructed and arranged to engage with the outer surface of the third tubular body to prevent the sprinkler device from moving in an upward direction along the third tubular body.

20 Claims, 7 Drawing Sheets

SPRINKLER DEVICE

TECHNICAL FIELD

The embodiments generally relate to the field of sprinkler devices.

BACKGROUND

Adjustment of sprinkler head heights can be a tedious task. Full excavation of the soil surrounding the sprinkler head is required before the sprinkler is unthreaded from the water supply pipe. Once removed, care must be taken not to let soil fall into the open supply pipe. A threaded adapter must then be cut to length and used as an extension to the water supply pipe before reinstalling the sprinkler head. Height adjustments using this method are only possible in discrete increments due to the threaded nature of the connection. This process is time consuming and does not allow fine adjustments of sprinkler head height.

There is a need for a sprinkler device that allows the position of the sprinkler to be adjustable along a water supply pipe.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed sprinkler device can include a first tubular body that includes at least a first portion and a second portion, the first portion of the first tubular body being connected to the second portion of the first tubular body; a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body; a first ring cap that is constructed and arranged to be attached onto a first end of the second tubular body, the first ring cap being further constructed and arranged to be positioned around a sprinkler riser, the first ring cap being further constructed and arranged to be in sliding communication with the sprinkler riser, the first ring cap being further constructed and arranged to retain the sprinkler riser; a first fluid seal constructed and arranged to be positioned between at least the first end of the second tubular body and the sprinkler riser, the first fluid seal being further constructed and arranged to be positioned under the first ring cap; a second fluid seal constructed and arranged to be positioned between the outer surface of the third tubular body and the inner surface of the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1A:
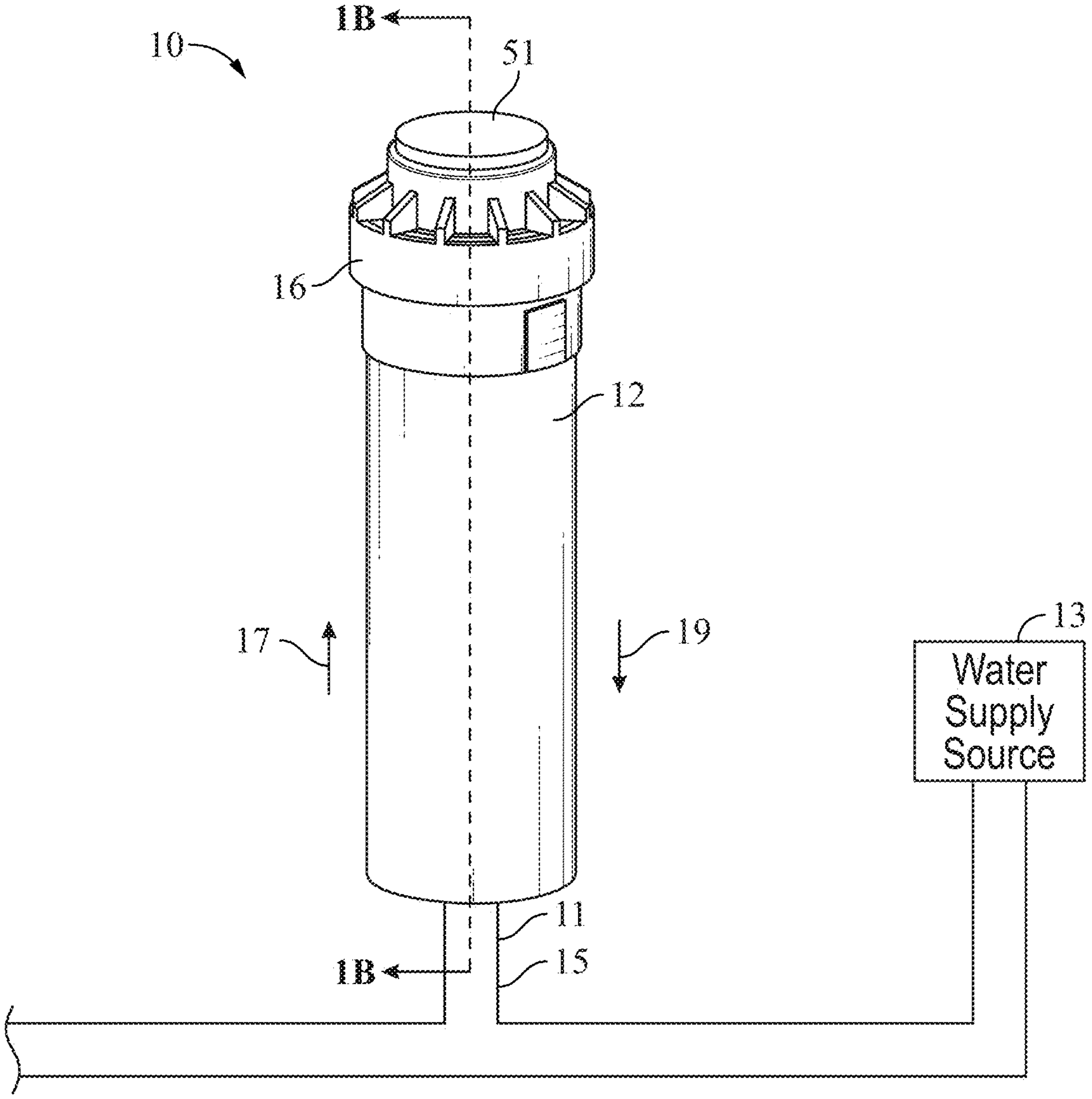
FIG. 1A illustrates a sprinkler device on a water supply pipe, according to some embodiments disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a sprinkler device. The sprinkler device can include a first tubular body and a second tubular body positioned in the first tubular body. The sprinkler device can include one or more toothed rings at least partially retained within a lower portion of the second tubular body. The one or more toothed rings can have two or more teeth that are constructed and arranged to be in sliding communication with at least an outer surface of a third tubular body so that a position of the sprinkler device is adjustable in a downward direction along the third tubular body. The two or more teeth can be further constructed and arranged to engage with the outer surface of the third tubular body to prevent the sprinkler device from moving in an upward direction along the third tubular body.

In some embodiments, any component of the sprinkler device can be made primarily of any suitable durable material. For example, in some embodiments, the first tubular body, the second tubular body, and the third tubular body can be made primarily of plastic, metal, or a combination thereof. In some embodiments, the first tubular body, the second tubular body, and the third tubular body can be made primarily of polyethylene, acrylonitrile butadiene styrene (ABS), nylon, polyvinyl chloride (PVC), any other suitable durable plastic, or any combination thereof. In some embodiments, the one or more toothed rings can be made primarily of metal.

Referring to FIG. 1A, a sprinkler device 10 is shown including a first tubular body 12. In some embodiments, a first ring cap 16 can be constructed and arranged to be mounted above the first tubular body 12. The ring cap 16 can be constructed and arranged to surround a nozzle portion 51 having one or more orifices (e.g., 46 in FIG. 1B) through which water can be discharged from the sprinkler device 10.

In some embodiments, the sprinkler device 10 can be mounted on a water supply pipe 15. A position of the sprinkler device 10 can be constructed and arranged to be adjustable in an upward direction 17 and in a downward direction 19 along at least a portion 11 of the water supply pipe 15. In some embodiments, the downward direction 19 can be opposite to the upward direction 17. In some embodiments, the water supply pipe 15 can be fluidly connected to a water supply source 13. That is, the water supply pipe 15 can be connected to a water supply source 13 such that fluid can flow between them.

Figure 1B:
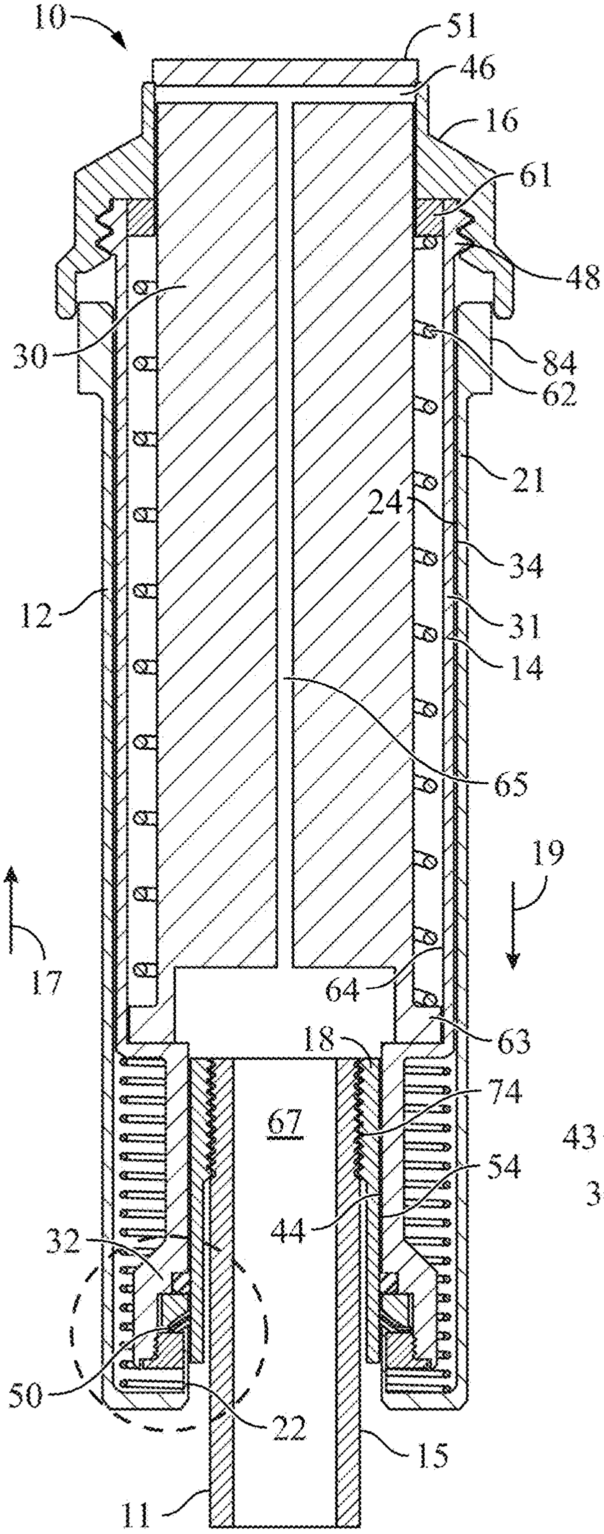
FIG. 1B illustrates a cross-sectional view of the sprinkler device shown in FIG. 1A, taken along line 1B-1B in FIG. 1A, according to some embodiments disclosed herein.
Figure 1C:
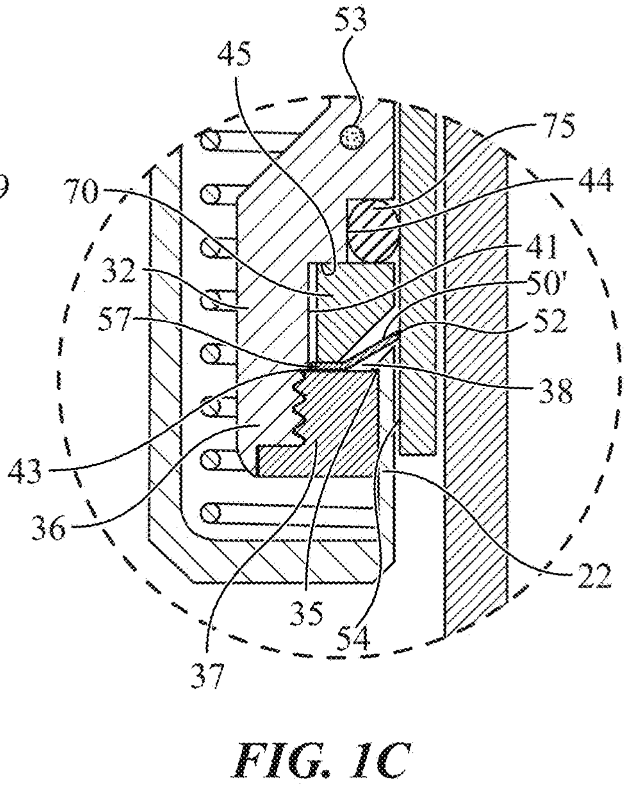
FIG. 1C illustrates an enlarged view of a portion of FIG. 1B, according to some embodiments disclosed herein.

Referring to FIGS. 1B and 1C, the first tubular body 12 can include at least a first portion 21 and a second portion 22, the first portion 21 of the first tubular body 12 being connected to the second portion 22 of the first tubular body 12. The first portion 21 of the first tubular body 12 can be connected to the second portion 22 of the first tubular body 12 in any suitable way. In some embodiments, the first portion 21 of the first tubular body 12 can be connected to the second portion 22 of the first tubular body 12 by being integrally formed with the second portion 22 of the first tubular body 12. For example, the first portion 21 of the first tubular body 12 and the second portion 22 of the first tubular body 12 can be integrally formed to form a single body.

In some embodiments, the first portion 21 of the first tubular body 12 can be connected to the second portion 22 of the first tubular body 12 by any suitable fluid sealing connection. For example, the first portion 21 of the first tubular body 12 can be connected to the second portion 22 of the first tubular body 12 by a threaded connection, a bonded connection, a welded connection, a flanged connection, an adhesive connection, any other fluid sealing connection(s), or any combination thereof. As another example, in some embodiments, the first portion 21 can be connected to the second portion 22 by any suitable number of tubular bodies.

In some embodiments, the sprinkler device 10 can include a second tubular body 14 that includes at least a first portion 31 and a second portion 32, the first portion 31 of the second tubular body 14 being connected to the second portion 32 of the second tubular body 14. The first portion 31 of the second tubular body 14 can be connected to the second portion 32 of the second tubular body 14 in any suitable way. In some embodiments, the first portion 31 of the second tubular body 14 can be connected to the second portion 32 of the second tubular body 14 by being integrally formed with the second portion 32 of the second tubular body 14. For example, the first portion 31 of the second tubular body 14 and the second portion 32 of the second tubular body 14 can be integrally formed to form a single body.

In some embodiments, the first portion 31 of the second tubular body 14 can be connected to the second portion 32 of the second tubular body 14 by any suitable fluid sealing connection. For example, the first portion 31 of the second tubular body 14 can be connected to the second portion 32 of the second tubular body 14 by a threaded connection, a bonded connection, a welded connection, a flanged connection, an adhesive connection, any other fluid sealing connection(s), or any combination thereof. As another example, in some embodiments, the first portion 31 can be connected to the second portion 32 by any suitable number of tubular bodies.

In some embodiments, the first ring cap 16 can be constructed and arranged to be attached onto a first end 48 of the second tubular body 14. As shown, in some embodiments, the first ring cap 16 can be constructed and arranged to be in threaded communication with the first end 48 of the second tubular body 14.

In some embodiments, the first ring cap 16 can be constructed and arranged to overlap an outer surface 84 of the first portion 21 of the first tubular body 12. By overlapping the outer surface 84 of the first portion 21 of the first tubular body 12, the first ring cap 16 can prevent dirt and debris from coming between the first tubular body 12 and the second tubular body 14. In some embodiments, the outer surface 84 of the first portion 21 of the first tubular body 12 is opposite to an inner surface 24 of the first portion 21 of the first tubular body 12.

In some embodiments, the sprinkler device 10 can include a sprinkler riser 30. In some embodiments, the sprinkler riser 30 can include the nozzle portion 51. In some embodiments, the first ring cap 16 can be constructed and arranged to be positioned around the sprinkler riser 30. In some embodiments, the first ring cap 16 can be constructed and arranged to be in sliding communication with the sprinkler riser 30 so that the sprinkler riser 30 is at least partially slidable relative to the first ring cap 16.

In some embodiments, the first ring cap 16 can be constructed and arranged to retain the sprinkler riser 30. For example, in some embodiments, a first fluid seal 61 can be positioned around the sprinkler riser 30. The first fluid seal 61 can be positioned between the first ring cap 16 and a first compression spring 62. The first compression spring 62 can be positioned between the first fluid seal 61 and a bottom lip 63 of the sprinkler riser 30. In some embodiments, the first ring cap 16 can engage with the first fluid seal 61 which engages with the first compression spring 62. The first compression spring 62 engages with the bottom lip 63 of the sprinkler riser 30 to retain the sprinkler riser 30. The sprinkler riser 30 can be at least partially slidable relative to the first ring cap 16 while being retained by the first ring cap 16. In some embodiments, the bottom lip 63 of the sprinkler riser 30 can be in sliding communication with an inner surface 64 of the first portion 31 of the second tubular body 14 so that the sprinkler riser 30 is at least partially slidable relative to the inner surface 64 of the first portion 31 of the second tubular body 14.

In some embodiments, the first fluid seal 61 can be constructed and arranged to be positioned between at least the first end 48 of the second tubular body 14 and the sprinkler riser 30. The first fluid seal 61 can be constructed and arranged to be positioned under the first ring cap 16. The first fluid seal 61 can be any suitable fluid seal such as, for example, a gasket. A suitable gasket can include an o-ring.

In some embodiments, one or more channels 65 in the sprinkler riser 30 can be in fluid communication with one or more orifices 46 of the sprinkler riser 30 and an interior 67 of the water supply pipe 15. When pressure in the water supply pipe 15 is increased, the increased pressure can exert a force on the sprinkler riser 30 that causes the sprinkler riser 30 to move in the upward direction 17 relative to the water supply pipe 15. After the sprinkler riser 30 rises, the one or more orifices 46 can rise above the first ring cap 16, and water can be discharged through the one or more orifices 46. When pressure in the water supply pipe 15 is decreased, the first compression spring 62 can exert a force on the bottom lip 63 of the sprinkler riser 30 that causes the sprinkler riser 30 to move in the downward direction 19 relative to the water supply pipe 15.

In some embodiments, the first portion 31 of the second tubular body 14 can have an outer surface 34 that is constructed and arranged to be in sliding communication with at least the inner surface 24 of the first portion 21 of the first tubular body 12. The outer surface 34 of the first portion 31 can be in sliding communication with at least the inner surface 24 so that the second tubular body 14 is at least partially slidable relative to the first tubular body 12.

In some embodiments, the second portion 32 of the second tubular body 14 can have an inner surface 44 that is constructed and arranged to be in sliding communication with at least an outer surface 54 of a third tubular body 18. The inner surface 44 can be in sliding communication with at least the outer surface 54 of the third tubular body 18 so that the second tubular body 14 is at least partially slidable relative to the third tubular body 18. In some embodiments, the third tubular body 18 can be a tubular adapter 18 that is in threaded communication with an outer surface 74 of a water supply pipe 15.

In some embodiments, a second fluid seal 75 can be constructed and arranged to be positioned between the outer surface 54 of the third tubular body 18 and the inner surface 44 of the second portion 32 of the second tubular body 14. The second fluid seal 75 can be any suitable fluid seal such as, for example, a gasket. A suitable gasket can include an o-ring.

In some embodiments, the second portion 32 of the second tubular body 14 can be constructed and arranged to retain at least the second portion 22 of the first tubular body 12. For example, in some embodiments, the second portion 22 of the first tubular body 12 can include a protrusion 35. The second portion 32 of the second tubular body 14 can include a recess 38 that is constructed and arranged to receive the protrusion 35.

In some embodiments, the second portion 32 of the second tubular body 14 can include a second ring cap 37 and a ring cap receiving portion 36. In some embodiments, the second ring cap 37 can be removably connected to the ring cap receiving portion 36. For example, in some embodiments, the ring cap receiving portion 36 can be in threaded communication with the second ring cap 37. In some embodiments, the ring cap receiving portion 36 can be connected to the first portion 31 of the second tubular body 14.

In some embodiments, the recess 38 can be defined by a top recess surface 45, a side recess surface 41, and a bottom recess surface 43 of the second portion 32 of the second tubular body 14. In some embodiments, the bottom recess surface 43 can be a surface of the second ring cap 37.

In some embodiments, one or more toothed rings 50 can be at least partially retained by the second portion 32 of the second tubular body 14. For example, in some embodiments, the one or more toothed rings 50 can include two or more teeth 52 extending from a ring body 57. In some embodiments, the ring body 57 can be positioned on the bottom recess surface 43, and the sprinkler device 10 can include an insert 70 retained within the recess 38 of the second portion 32 of the second tubular body 14. The insert 70 can be positioned between the top recess surface 45 and the ring body 57 to press the ring body 57 against the bottom recess 43 and to retain the one or more toothed rings 50.

In some embodiments, the two or more teeth 52 can be constructed and arranged to be in sliding communication with at least the outer surface 54 of the third tubular body 18 so that a position 53 of the sprinkler device 10 is adjustable in the downward direction 19 relative to the third tubular body 18. For example, the two or more teeth 52 can be angled toward the upward direction 17 relative to the third tubular body 18 so that the two or more teeth 52 can slide on the outer surface 54 of the third tubular body 18 in the downward direction 19. In some embodiments, the upward direction 17 can be parallel to the outer surface 54 of the third tubular body 18 and a longitudinal axis of the third tubular body 18.

In some embodiments, the two or more teeth 52 can be constructed and arranged to engage with the outer surface 54 of the third tubular body 18 to prevent the sprinkler device 10 from moving in the upward direction 17 relative to the third tubular body 18. For example, the two or more teeth 52 can extend toward the outer surface 54. In some embodiments, the two or more teeth 52 can be angled toward the upward direction 17 relative to the third tubular body 18 so that the two or more teeth 52 are prevented from sliding on the outer surface 54 of the third tubular body 18 in the upward direction 17. In some embodiments, the one or more toothed rings 50 include a first toothed ring 50' having two or more teeth 52 that are constructed and arranged to engage with the outer surface 54 of the third tubular body 18.

Figure 1D:
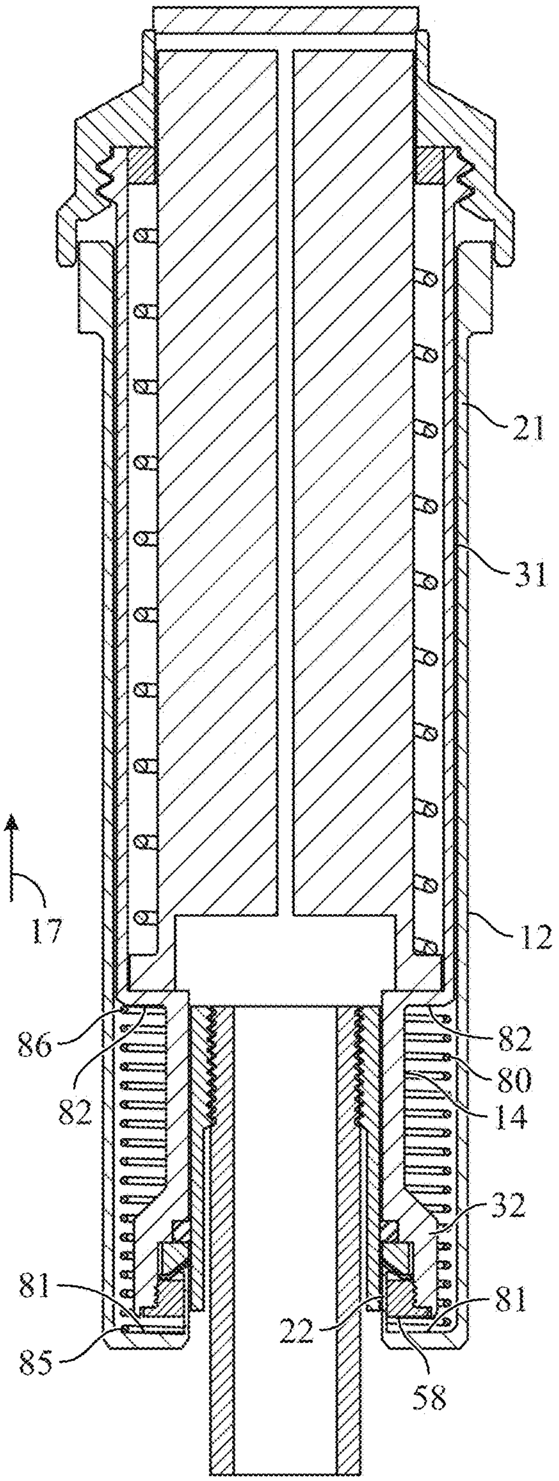
FIG. 1D illustrates a cross-sectional view of the sprinkler device shown in FIG. 1A, with two or more teeth of a toothed ring deflected, according to some embodiments disclosed herein.
Figure 1E:
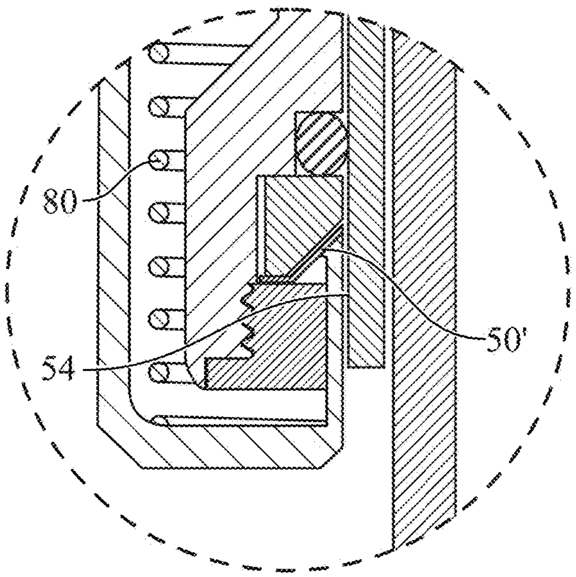
FIG. 1E illustrates an enlarged view of a portion of FIG. 1D, according to some embodiments disclosed herein.

Referring to FIG. 1D, in some embodiments, the second portion 22 of the first tubular body 12 can be constructed and arranged to be inserted into a second end 58 of the second tubular body 14. In some embodiments, the first tubular body 12 can slide in the upward direction 17 relative to the second tubular body 14 to deflect the two or more teeth 52 of the first toothed ring 50'. Referring to FIG. 1E, the second portion 22 of the first tubular body 12 can be constructed and arranged to deflect the two or more teeth 52 of the first toothed ring 50' so that the two or more teeth 52 are at least partially disengaged with the outer surface 54 of the third tubular body 18. In some embodiments, the insert 70 can be shaped to accommodate the two or more teeth 52 when the two or more teeth 52 are deflected in the upward direction 17.

In some embodiments, the sprinkler device 10 can include a second spring 80. In some embodiments, the second spring 80 can be a second compression spring 80. In some embodiments, the first tubular body 12 can include a third portion 81 that connects the first portion 21 of the first tubular body 12 to the second portion 22 of the first tubular body 12. In some embodiments, the second tubular body 14 can include a third portion 82 that connects the first portion 31 of the second tubular body 14 to the second portion 32 of the second tubular body 14. In some embodiments, the second compression spring 80 can have a first end 85 that is constructed and arranged to engage with the third portion 81 of the first tubular body 12. In some embodiments, the second compression spring 80 can have a second end 86 that is constructed and arranged to engage with the third portion 82 of the second tubular body 14.

Figure 2A:
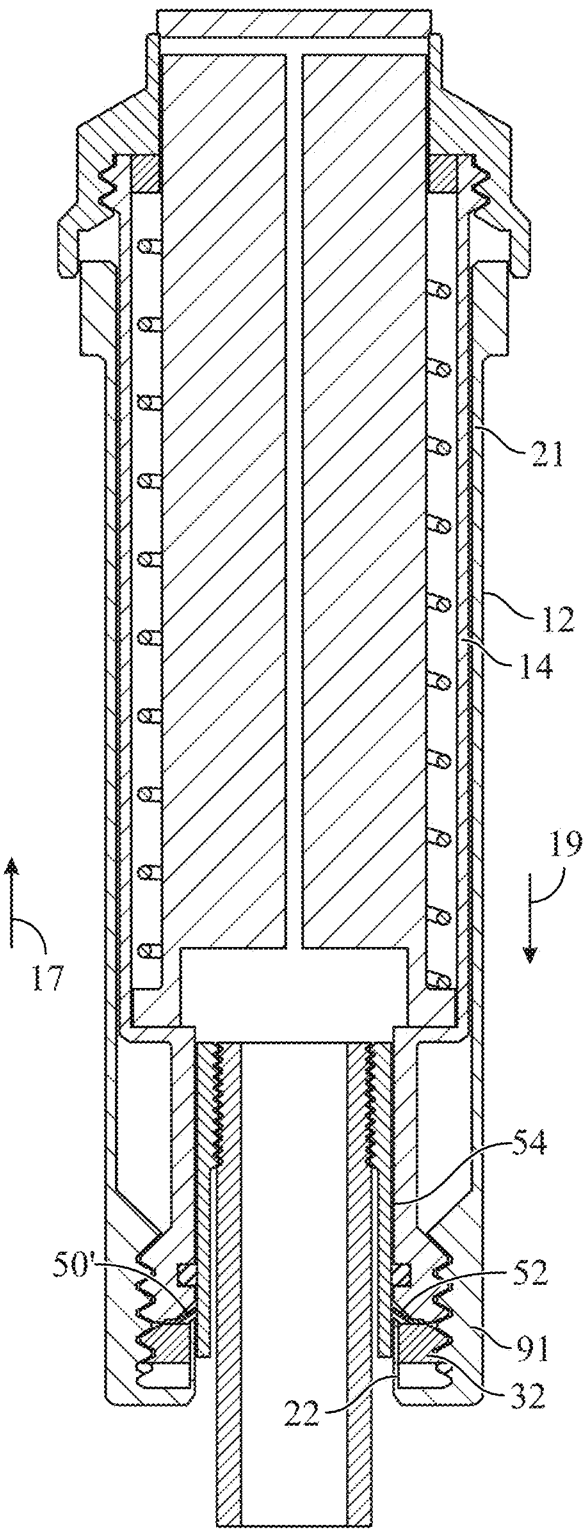
FIG. 2A illustrates a cross-sectional view of a sprinkler device that includes a first tubular body in threaded communication with a second tubular body, according to some embodiments disclosed herein.

Referring to FIG. 2A, the first tubular body 12 can include a third portion 91 that connects the first portion 21 of the first tubular body 12 to the second portion 22 of the first tubular body 12. In some embodiments, the third portion 91 of the first tubular body 12 can be in threaded communication with the second portion 32 of the second tubular body 14.

Figure 2B:
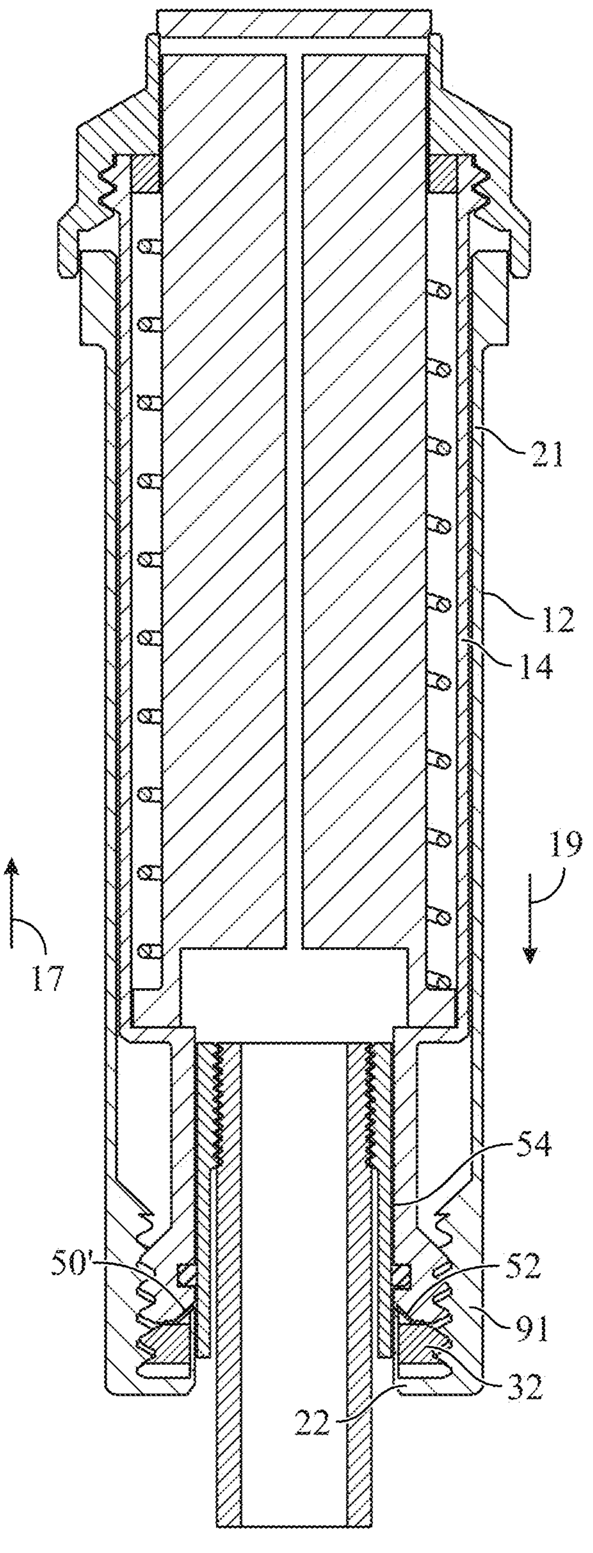
FIG. 2B illustrates the sprinkler device of FIG. 2A with the first tubular body unscrewed relative to the second tubular body, according to some embodiments disclosed herein.

Referring to FIG. 2B, in some embodiments, the first tubular body 12 can be screwed to move in the upward direction 17 relative to the second tubular body 14 to deflect the two or more teeth 52 of the first toothed ring 50'. In some embodiments, the second portion 22 of the first tubular body 12 can be constructed and arranged to deflect the two or more teeth 52 of the first toothed ring 50' so that the two or more teeth 52 are at least partially disengaged with the outer surface 54 of the third tubular body 18. In some embodiments, the second portion 22 of the first tubular body 12 can be constructed and arranged to engage with the two or more teeth 52 of the first toothed ring 50' to deflect the two or more teeth 52.

Figure 3:
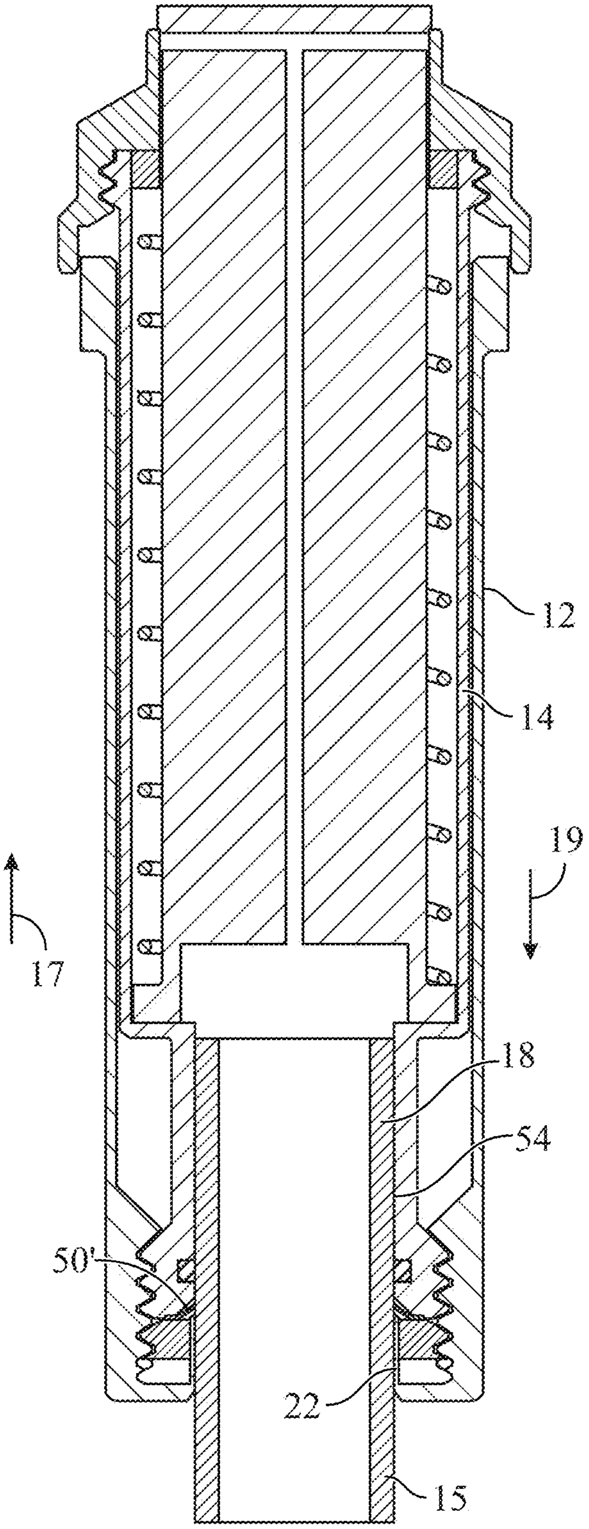
FIG. 3 illustrates a sprinkler device installed directly on a water supply pipe, according to some embodiments disclosed herein.

Referring to FIG. 3, in some embodiments, the third tubular body 18 can be a water supply pipe 15. For example, in some embodiments, if a tubular adapter is not used, the sprinkler device 10 can be installed directly on the water supply pipe 15.

Figure 4:
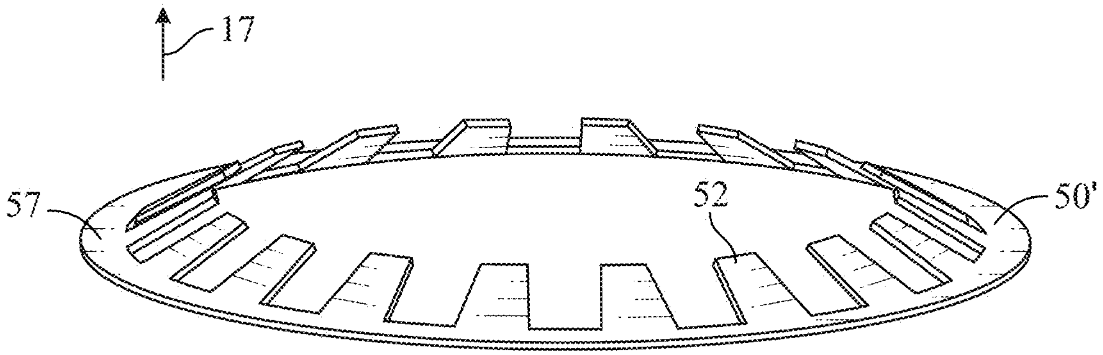
FIG. 4 illustrates a toothed ring, according to some embodiments disclosed herein.

Referring to FIG. 4, in some embodiments, a toothed ring 50' can include two or more teeth 52 extending from a ring body 57. In some embodiments, the two or more teeth 52 can extend radially inward from the ring body 57. In some embodiments, the two or more teeth 52 can be angled in an upward direction 17 relative to the ring body 57. In some embodiments, the two or more teeth 52 can include a plurality of teeth 52.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a sprinkler device can include a first tubular body that includes at least a first portion and a second portion, the first portion of the first tubular body being connected to the second portion of the first tubular body; a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body; a first ring cap that is constructed and arranged to be attached onto a first end of the second tubular body, the first ring cap being further constructed and arranged to be positioned around a sprinkler riser, the first ring cap being further constructed and arranged to be in sliding communication with the sprinkler riser, the first ring cap being further constructed and arranged to retain the sprinkler riser; a first fluid seal constructed and arranged to be positioned between at least the first end of the second tubular body and the sprinkler riser, the first fluid seal being further constructed and arranged to be positioned under the first ring cap; a second fluid seal constructed and arranged to be positioned between the outer surface of the third tubular body and the inner surface of the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

According to variation 2, a sprinkler device can include a first tubular body that includes at least a first portion and a second portion, the first portion of the first tubular body being connected to the second portion of the first tubular body; a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body; a first ring cap that is constructed and arranged to be attached onto a first end of the second tubular body, the first ring cap being further constructed and arranged to be positioned around a sprinkler riser, the first ring cap being further constructed and arranged to be in sliding communication with the sprinkler riser; a first fluid seal constructed and arranged to be positioned between at least the first end of the second tubular body and the sprinkler riser, the first fluid seal being further constructed and arranged to be positioned under the first ring cap; a second fluid seal constructed and arranged to be positioned between the third tubular body and the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

According to variation 3, a sprinkler device can include a first tubular body that includes at least a first portion and a second portion, the first portion of the first tubular body being connected to the second portion of the first tubular body; a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body; a first ring cap that is constructed and arranged to be attached onto a first end of the second tubular body, the first ring cap being further constructed and arranged to be positioned around a sprinkler riser; a first fluid seal constructed and arranged to be positioned between at least the first end of the second tubular body and the sprinkler riser; a second fluid seal constructed and arranged to be positioned between the third tubular body and the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

Variation 4 can include the sprinkler device of variation 1, variation 2, or variation 3, wherein the third tubular body is a tubular adapter that is in threaded communication with an outer surface of a water supply pipe.

Variation 5 can include the sprinkler device of variation 1, variation 2, or variation 3, wherein the third tubular body is a water supply pipe.

Variation 6 can include the sprinkler device of variation 1, variation 2, or variation 3, wherein: the one or more toothed rings include a first toothed ring having two or more teeth that are constructed and arranged to engage with the outer surface of the third tubular body; the second portion of the first tubular body is constructed and arranged to be inserted into a second end of the second tubular body; the second portion of the first tubular body being further constructed and arranged to deflect the two or more teeth of the first toothed ring so that the two or more teeth are at least partially disengaged with the outer surface of the third tubular body.

Variation 7 can include the sprinkler device of variation 1, variation 2, or variation 3, further comprising: a first compression spring; wherein: the first tubular body includes a third portion that connects the first portion of the first tubular body to the second portion of the first tubular body; the second tubular body includes a third portion that connects the first portion of the second tubular body to the second portion of the second tubular body; the first compression spring has a first end that is constructed and arranged to engage the third portion of the first tubular body; and the first compression spring has a second end that is constructed and arranged to engage the third portion of the second tubular body.

Variation 8 can include the sprinkler device of variation 1, variation 2, or variation 3, wherein: the first tubular body includes a third portion that connects the first portion of the first tubular body to the second portion of the first tubular body; and the third portion of the first tubular body is in threaded communication with the second portion of the second tubular body.

Variation 9 can include the sprinkler device of variation 1, variation 2, or variation 3, wherein: the first ring cap is constructed and arranged to overlap an outer surface of the first portion of the first tubular body; and the outer surface of the first portion of the first tubular body is opposite to the inner surface of the first portion of the first tubular body.

Variation 10 can include the sprinkler device of variation 1, variation 2, or variation 3, wherein: the second portion of the first tubular body includes a protrusion; the second portion of the second tubular body includes a recess that is constructed and arranged to receive the protrusion.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A sprinkler device, comprising:

a first tubular body that includes at least a first portion and a second portion, the first portion of the first tubular body being connected to the second portion of the first tubular body;

a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body;

a first ring cap that is constructed and arranged to be attached onto a first end of the second tubular body, the first ring cap being further constructed and arranged to be positioned around a sprinkler riser, the first ring cap being further constructed and arranged to be in sliding communication with the sprinkler riser, the first ring cap being further constructed and arranged to retain the sprinkler riser;

a first fluid seal constructed and arranged to be positioned between at least the first end of the second tubular body and the sprinkler riser, the first fluid seal being further constructed and arranged to be positioned under the first ring cap;

a second fluid seal constructed and arranged to be positioned between the outer surface of the third tubular body and the inner surface of the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

2. The sprinkler device of claim 1, wherein the third tubular body is a tubular adapter that is in threaded communication with an outer surface of a water supply pipe.

3. The sprinkler device of claim 1, wherein the third tubular body is a water supply pipe.

4. The sprinkler device of claim 1, wherein:

the one or more toothed rings include a first toothed ring having two or more teeth that are constructed and arranged to engage with the outer surface of the third tubular body;

the second portion of the first tubular body is constructed and arranged to be inserted into a second end of the second tubular body;

the second portion of the first tubular body being further constructed and arranged to deflect the two or more teeth of the first toothed ring so that the two or more teeth are at least partially disengaged with the outer surface of the third tubular body.

5. The sprinkler device of claim 1, further comprising:

a first spring; wherein:

the first tubular body includes a third portion that connects the first portion of the first tubular body to the second portion of the first tubular body;

the second tubular body includes a third portion that connects the first portion of the second tubular body to the second portion of the second tubular body;

the first spring has a first end that is constructed and arranged to engage the third portion of the first tubular body; and the first spring has a second end that is constructed and arranged to engage the third portion of the second tubular body.

6. The sprinkler device of claim 1, wherein:

the first tubular body includes a third portion that connects the first portion of the first tubular body to the second portion of the first tubular body; and the third portion of the first tubular body is in threaded communication with the second portion of the second tubular body.

7. The sprinkler device of claim 1, wherein:

the first ring cap is constructed and arranged to overlap an outer surface of the first portion of the first tubular body; and the outer surface of the first portion of the first tubular body is opposite to the inner surface of the first portion of the first tubular body.

8. The sprinkler device of claim 1, wherein:

the second portion of the first tubular body includes a protrusion;

the second portion of the second tubular body includes a recess that is constructed and arranged to receive the protrusion.

9. A sprinkler device, comprising:

a first tubular body that includes at least a first portion and a second portion, the first portion of the first tubular body being connected to the second portion of the first tubular body;

a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body;

a first ring cap that is constructed and arranged to be attached onto a first end of the second tubular body, the first ring cap being further constructed and arranged to be positioned around a sprinkler riser, the first ring cap being further constructed and arranged to be in sliding communication with the sprinkler riser;

a first fluid seal constructed and arranged to be positioned between at least the first end of the second tubular body and the sprinkler riser, the first fluid seal being further constructed and arranged to be positioned under the first ring cap;

a second fluid seal constructed and arranged to be positioned between the third tubular body and the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

10. The sprinkler device of claim 9, wherein the third tubular body is a tubular adapter that is in threaded communication with an outer surface of a water supply pipe.

11. The sprinkler device of claim 9, wherein the third tubular body is a water supply pipe.

12. The sprinkler device of claim 9, wherein:

the one or more toothed rings include a first toothed ring having two or more teeth that are constructed and arranged to engage with the outer surface of the third tubular body;

the second portion of the first tubular body is constructed and arranged to be inserted into a second end of the second tubular body;

the second portion of the first tubular body being further constructed and arranged to deflect the two or more teeth of the first toothed ring so that the two or more teeth are at least partially disengaged with the outer surface of the third tubular body.

13. The sprinkler device of claim 9, further comprising:

a first spring; wherein:

the first tubular body includes a third portion that connects the first portion of the first tubular body to the second portion of the first tubular body;

the second tubular body includes a third portion that connects the first portion of the second tubular body to the second portion of the second tubular body;

the first spring has a first end that is constructed and arranged to engage the third portion of the first tubular body; and the first spring has a second end that is constructed and arranged to engage the third portion of the second tubular body.

14. The sprinkler device of claim 9, wherein:

the first tubular body includes a third portion that connects the first portion of the first tubular body to the second portion of the first tubular body; and the third portion of the first tubular body is in threaded communication with the second portion of the second tubular body.

15. The sprinkler device of claim 9, wherein:

the first ring cap is constructed and arranged to overlap an outer surface of the first portion of the first tubular body; and the outer surface of the first portion of the first tubular body is opposite to the inner surface of the first portion of the first tubular body.

16. The sprinkler device of claim 9, wherein:

the second portion of the first tubular body includes a protrusion;

the second portion of the second tubular body includes a recess that is constructed and arranged to receive the protrusion.

17. A sprinkler device, comprising:

a first tubular body that includes at least a first portion and a second portion, the first portion of the first tubular body being connected to the second portion of the first tubular body;

a second tubular body that includes at least a first portion and a second portion, the first portion of the second tubular body being connected to the second portion of the second tubular body, the first portion of the second tubular body having an outer surface that is constructed and arranged to be in sliding communication with at least an inner surface of the first portion of the first tubular body, the second portion of the second tubular body being constructed and arranged to retain at least the second portion of the first tubular body, the second portion of the second tubular body having an inner surface that is constructed and arranged to be in sliding communication with at least an outer surface of a third tubular body;

a first ring cap that is constructed and arranged to be attached onto a first end of the second tubular body, the first ring cap being further constructed and arranged to be positioned around a sprinkler riser;

a first fluid seal constructed and arranged to be positioned between at least the first end of the second tubular body and the sprinkler riser;

a second fluid seal constructed and arranged to be positioned between the third tubular body and the second portion of the second tubular body; and one or more toothed rings at least partially retained by the second portion of the second tubular body, the one or more toothed rings having two or more teeth that are constructed and arranged to be in sliding communication with at least the outer surface of the third tubular body so that a position of the sprinkler device is adjustable in a downward direction relative to the third tubular body, the two or more teeth being further constructed and arranged to engage with the outer surface of the third tubular body to prevent the sprinkler device from moving in an upward direction relative to the third tubular body.

18. The sprinkler device of claim 17, wherein:

the one or more toothed rings include a first toothed ring having two or more teeth that are constructed and arranged to engage with the outer surface of the third tubular body;

the second portion of the first tubular body is constructed and arranged to be inserted into a second end of the second tubular body;

the second portion of the first tubular body being further constructed and arranged to deflect the two or more teeth of the first toothed ring so that the two or more teeth are at least partially disengaged with the outer surface of the third tubular body.

19. The sprinkler device of claim 17, further comprising:

a first spring; wherein:

the first tubular body includes a third portion that connects the first portion of the first tubular body to the second portion of the first tubular body;

the second tubular body includes a third portion that connects the first portion of the second tubular body to the second portion of the second tubular body;

the first spring has a first end that is constructed and arranged to engage the third portion of the first tubular body; and the first spring has a second end that is constructed and arranged to engage the third portion of the second tubular body.

20. The sprinkler device of claim 17, wherein:

the first tubular body includes a third portion that connects the first portion of the first tubular body to the second portion of the first tubular body; and the third portion of the first tubular body is in threaded communication with the second portion of the second tubular body.

* * * * *